Patented June 29, 1937

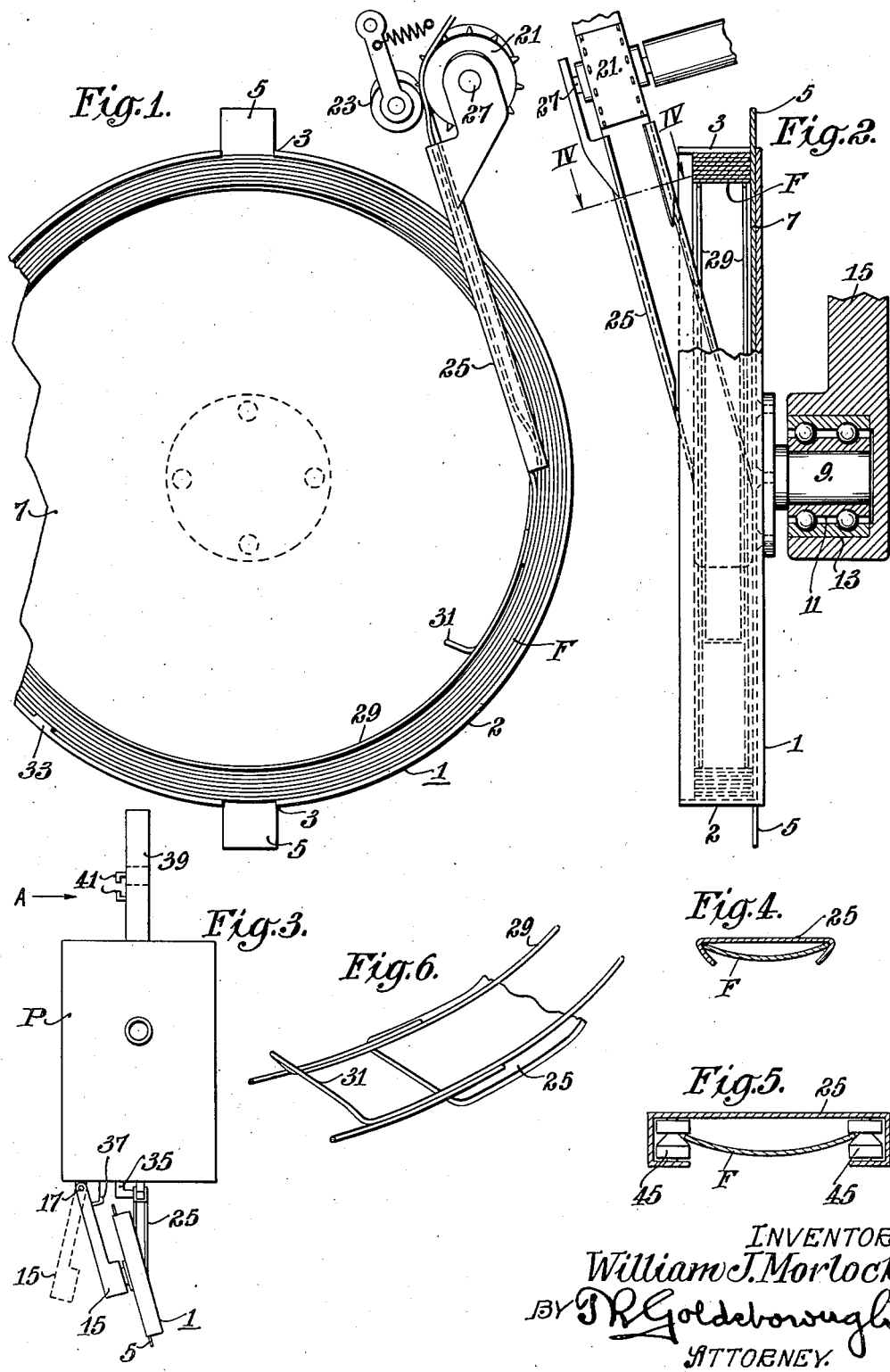

2,085,439

UNITED STATES PATENT OFFICE 2,085,439

FILM HANDLING APPARATUS

William J. Morlock, Collingswood, N. J., assignor to Radio Corporation of America, a corporation of Delaware Application January 31, 1935, Serial No. 4,216

7 Claims. (Cl. 88—18.7)

This invention relates to film handling apparatus, and more particularly to apparatus for winding up moving picture film during exhibition thereof.

It is well known that most moving picture projectors in common use at present wind up the exhibited film in a manner such that rewinding thereof is necessary before the same film can subsequently again be exhibited. This, of course, is time and labor consuming, and various proposals have been made to eliminate this nuisance, the most common being to join the ends of the film and wind it in at the center while simultaneously unwinding it at the periphery. However, this proposal, like others heretofore made, is subject to a number of disadvantages about as serious as those present in film winding mechanisms employed in standard projecting machines.

The primary object of my invention is to provide an improved method of and apparatus for winding standard films in such a manner after being exhibited that rewinding thereof will not be necessary before the films can again be exhibited.

More specifically, it is an object of my invention to provide novel film winding apparatus which will, in a single operation, perform the dual function of winding up the film as now performed by the common take-up reel and of simultaneously conditioning the film for future exhibition, as now performed by the common film rewinding mechanism.

Another object of my invention is to provide improved film-winding mechanism which will eliminate the necessity of employing the reels now in common use.

Still another object of my invention is to provide improved film winding mechanism wherein the natural stiffness of moving picture film under certain conditions is availed of to assist in feeding the film forward.

A further object of my invention is to provide, in moving picture apparatus, improved film handling apparatus which will not only wind up the film in a manner that will not require rewinding thereof between exhibitions but which can readily be applied to existing types of moving picture machines.

Still a further object of my invention is to provide film handling apparatus of this type which will be especially useful in apparatus designed for use by amateurs.

It is another object of my invention to provide improved film handling apparatus of the type previously set forth which will be economical in cost and highly efficient in use.

In accordance with my invention, I feed the film into a rotatable cylindrical container through a guide or chute which is angularly related to the container and which bends or flexes the film transversely in order to stiffen it so that its forward end, which is directed by the chute against an abutment on the inner periphery of the container, rotates the latter upon engagement with the abutment. The film thereafter winds itself around a contractible, circular spring secured to the guide and acting as a "hub" for the accumulating film, a pivotal mounting for the guide permitting the accumulation or winding of the film from the periphery of the container inwardly toward the center thereof in the form of an internally wound coil. Thus, when the film has been entirely fed through, its forward end is on the periphery and its terminal end in the center, whereby it is ready to be removed to a second container corresponding to the usual feed magazine and to be immediately fed forward again from the periphery without rewinding.

The novel features that I consider characteristic of my invention are set forth with particularity in the appended claims. The invention itself, however, both as to its organization and method of operation, together with additional objects and advantages thereof, will best be understood from the following description, when read in connection with the accompanying drawing, in which Figure 1 is a side elevation of a film winding mechanism in accordance with my invention, Fig. 2 is an end elevation thereof, Fig. 3 is a view illustrating the manner in which my invention may be applied to a moving picture projector, Fig. 4 shows a section of the film guide or chute taken on the line IV—IV of Fig. 2, Fig. 5 is a view similar to Fig. 4 but showing a modified film guide, and Fig. 6 is a detail, perspective view of the contractible spring member on which the film is wound.

Referring more specifically to the drawing, wherein like reference characters indicate corresponding parts throughout, there is shown, in Figures 1 and 2, a film container comprising an open-ended cylindrical or drum-like casing member 1 having its cylindrical portion 2 broken away at diametrically opposite points 3 for the reception of a pair of diametrically opposed, outwardly extending lugs 5 on a circular plate 7 having a diameter just slightly smaller than that of the casing member 1. The casing 1 is secured centrally to a stub shaft 9 which slidably and frictionally fits within the inner raceway 11 of a ball bearing 13 carried by a bracket member 15, itself pivotally mounted on the bottom of a projector P, as at 17 (see Fig. 3). The frictional fit between the shaft 9 and the raceway 11 permits rotation of the casing 1 in the bearing 13 in a manner hereinafter more fully described, and the plate 7 rotates with it since the two are releasably interlocked through the lugs 5 and the broken-away portions 3.

In place of the usual take-up reel found in projectors now commonly in use, I provide a feed sprocket 21 which may be driven in any desired manner and against which a film F, which is being exhibited and which it is desired to wind up subsequent to exhibition, is held by a spring pressed roller 23. A film guide or chute 25 is pivotally mounted on the shaft 27 on which the sprocket 21 rotates and is angularly related to the casing member 1 in such a manner that the film F fed therethrough by the sprocket 21 will approach the inner periphery of the cylindrical portion 2 in a substantially circumferential direction (see Fig. 2). The guide 25, as will be noted, comprises an elongated chute-like member of less width than the film to force the film to flex transversely (Fig. 4). This greatly stiffens that portion of the film which is within the chute 25 and prevents the film from buckling so that it will have considerable strength in compression in a longitudinal direction.

Secured to the free end of the guide 25 is a substantially circular coil spring 29 which may be made of a single strand of U-shaped wire of a length greater than the circumference of the cylindrical portion 2. Thus, when fitted within the casing 1, the ends of the spring 29 will overlap each other even when the spring is fully expanded and bears against the inner periphery of the cylindrical portion 2, as clearly shown in Figs. 1 and 6, and the U end thereof may be inwardly offset, as at 31, for facile manual grasping. This is desirable for a reason presently to be set forth.

The inner periphery of the cylindrical portion 2 is provided with an inwardly extending rib or abutment 33. Normally, that is, when the casing 1 is empty, the spring 29 will expand into engagement with the casing portion 2 and will also force the free end of the guide 25 into close proximity to the portion 2. Thus, as the sprocket 21 feeds the forward end of the film through the guide 25, the said film end will be led into engagement with the inner periphery of the cylindrical portion 2 and will pass therealong, under the influence of the spring 29, until it abuts against the abutment 33 whereupon it will force the container 1 to commence rotation. The film will have sufficient strength to do this by reason of being flexed in the guide 25. Continued rotation of the container 1 as the film is fed forward will result in the film winding itself into a coil in an internal direction, that is, from the periphery inwardly toward the center of the container and about the spring 29, the spring acting as a "hub", so to speak, and gradually contracting in diameter as each turn of the container adds another thickness of film to the coil, and the guide 25 gradually pivoting around the shaft 27 as the film is wound with the free end thereof moving along an arc substantially radially of the coil or the container. This continues until the entire film has been wound up and, since the forward end thereof is at the periphery of the coil, it is ready to be immediately again exhibited without rewinding.

In Fig. 3, I have shown how my novel winding mechanism may be applied to a projector. The shaft 27 is preferably mounted in a horizontal position on a bracket or the like 35 at the bottom of the projector, so that the guide 25 extends vertically downwardly and the spring 29 occupies a position at an angle thereto inclined downwardly to the right. The bracket 15 is then swung on its pivot 17 until the container 1 receives the spring 29, and the bracket 15 is locked in this position by a suitable latch mechanism 37. In this position, the stub shaft 9 is inclined downwardly to the left and the container 1 is solidly supported.

Mounted on the top of the projector is a feed magazine 39 which, like the container 1, is cylindrical in shape and open at one end (the left, as shown in Fig. 3). The magazine 39 has an internal diameter slightly greater than the external diameter of the container 1 and is provided at its open end with a pair of L-shaped catch members 41 at opposite ends of a diameter of the magazine.

A film in the feed magazine 39 is exhibited in the usual manner and is wound up in the container 1 in the manner described above. Thereafter, the operator grasps the inwardly turned end 31 of the spring 29 and pulls it clockwise, as viewed in Fig. 1, in order to further contract the spring and free it from engagement with the wound film, whereupon the bracket 15 is swung into the dotted line position shown in Fig. 3. The container 1 is then removed from the bracket 15 with the plate 7 and the wound film resting therein by withdrawing the stub shaft 9 from the raceway 11.

The container 1 with its film and plate 7 is then inserted into the magazine 39 in the direction of the arrow A with its open end forward until the lugs 5 engage the magazine 39. The plate 7 is then turned until its lugs engage the catch members 41 and the container 1 is withdrawn from the magazine 39, leaving the film in the magazine and the plate 7 acting as a cover therefor. A new plate 7 is then inserted into the container 1 and the latter is again mounted on the bracket 15, whereupon the parts may be reset and the film again exhibited.

In Fig. 5, I have shown a slightly modified form of guide for the film. The chute 25 is made considerably thicker than the film and a plurality of rollers 45 having V-shaped peripheral notches therein are mounted in the chute along the longitudinal edges thereof, the distance between the bottoms of the V's being less than the transverse dimension of the film. The film is flexed transversely when the longitudinal edges thereof engage the bottoms of the notches, and the advantage of providing the rollers 45 is that less resistance is offered to the passage of the film than in the case of a chute such as shown in Fig. 4.

While I have shown and described certain details of my invention, it will be apparent to those skilled in the art that many modifications thereof are possible. For example, the bracket member 15 may be fixed on the projector and the bracket member 35 may be pivoted thereon in which case the guide 25 and its spring 29 would be retractible from the container 1. Also, the spring 29 may consist of a single band, if desired. I prefer, however, to make the spring 29 as illustrated in the drawing for the reason that it will engage only the edges of the film and will not scratch or otherwise mar the film. The chute 25 may also be formed in any suitable manner other than the two illustrated and described, so long as it flexes the film transversely. Many other modifications and changes will, no doubt, readily suggest themselves to those skilled in the art. It will also be apparent that my invention is not limited to moving picture films, as it may be applied to fields in which other strips or tapes may be used, as, for example, in reproducing sound records formed either on photographic strips or on magnetic steel tapes or wires. I therefore desire that only such limitations shall be imposed upon my invention as are necessitated by the prior art and by the spirit of the appended claims.

I claim as my invention:

1. In film handling apparatus, the combination of a rotatable container, an abutment on the inner periphery thereof, a pivoted film guide angularly associated with said container and normally positioned to direct the forward end of a film passed therethrough toward said abutment, said guide being formed to flex the film transversely whereby to stiffen it longitudinally in said guide, means for feeding said stiffened film through said guide whereby the forward end thereof will engage said abutment and cause said container to rotate, and a substantially circular spring secured to said guide for insuring engagement of the forward edge of the film with said abutment, the ends of said spring overlapping each other.

2. In film handling apparatus, the combination of a rotatable container, an abutment on the inner periphery thereof, a pivoted film guide angularly associated with said container and normally positioned to direct the forward end of a film passed therethrough toward said abutment, said guide being formed to flex the film transversely whereby to stiffen it longitudinally in said guide, means for feeding said stiffened film through said guide whereby the forward end thereof will engage said abutment and cause said container to rotate, and a substantially circular spring secured to said guide for insuring engagement of the forward edge of the film with said abutment, the ends of said spring overlapping each other and the free end of said spring being offset for facile manual grasping.

3. In film handling apparatus, the combination of a rotatable container, an abutment on the inner periphery thereof, a pivoted film guide angularly associated with said container and normally positioned to direct the forward end of a film passed therethrough toward said abutment, said guide being formed to flex the film transversely whereby to stiffen it longitudinally in said guide, means for feeding said stiffened film through said guide whereby the forward end thereof will engage said abutment and cause said container to rotate, and a substantially circular spring secured to said guide, said spring being radially contractible and being normally in engagement with the inner periphery of said container whereby to insure engagement of the forward edge of the film with said abutment, said film being adapted to wind itself in a coil from the periphery of said container inwardly toward the center thereof, around said spring as said container is rotated, and said spring yielding and contracting in response to the winding of the film thereabout.

4. In film handling apparatus, the combination of film guiding means, film advancing means at one end thereof for feeding the film into said guiding means, and a radially contractible, coiled spring coiled through a complete circumference and having one end secured to the other end of said guiding means and constituting an extension thereof.

5. In film handling apparatus, the combination of film guiding means, film advancing means at one end thereof for feeding the film into said guiding means, a radially contractible, coiled spring having one end secured to the other end of said guiding means and constituting an extension thereof, and means surrounding said spring adapted to cause the film to wind itself around said spring as a core after leaving said guiding means.

6. A container for a coil of film comprising an open-ended cylindrical member having its cylindrical portion broken-away at a plurality of spaced points, and a plate adapted to fit within said member through the open end thereof, said plate having a plurality of peripheral lugs extending outwardly therefrom, said lugs corresponding in number to and being adapted to fit within said broken-away portions whereby said member and said plate may be releasably interlocked for rotation as a unit, and said cylindrical member having a film engaging element on the inner periphery thereof.

7. A container for a coil of film comprising an open-ended cylindrical member having its cylindrical portion broken away at diametrically opposite points, and a circular plate adapted to fit within said member through the open end thereof, said plate having a pair of diametrically opposed lugs extending radially outwardly therefrom and adapted to fit within said broken-away portions for releasably interlocking said member and said plate for rotation as a unit, and said cylindrical member having a film engaging element on the inner periphery thereof.

WILLIAM J. MORLOCK.